United States Patent
Nose

(10) Patent No.: US 10,979,628 B2
(45) Date of Patent: Apr. 13, 2021

(54) IMAGE PROCESSING APPARATUS, IMAGE PROCESSING SYSTEM, IMAGE PROCESSING METHOD, AND RECORDING MEDIUM

(71) Applicant: Ricoh Company, Ltd., Tokyo (JP)

(72) Inventor: Masaki Nose, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 5 days.

(21) Appl. No.: 16/245,510

(22) Filed: Jan. 11, 2019

(65) Prior Publication Data
US 2019/0230279 A1  Jul. 25, 2019

(30) Foreign Application Priority Data
Jan. 23, 2018 (JP) .............................. JP2018-009066

(51) Int. Cl.
| H04N 5/232 | (2006.01) |
| H04N 7/14 | (2006.01) |
| G06K 9/00 | (2006.01) |
| G02B 5/20 | (2006.01) |

(52) U.S. Cl.
CPC ..... *H04N 5/23229* (2013.01); *G06K 9/00248* (2013.01); *H04N 7/147* (2013.01); *G02B 5/20* (2013.01)

(58) Field of Classification Search
None
See application file for complete search history.

(56) References Cited

U.S. PATENT DOCUMENTS

2010/0119157 A1* 5/2010 Kameyama .......... H04N 19/115
                                                    382/195
2010/0166055 A1   7/2010 Schmit et al.
(Continued)

FOREIGN PATENT DOCUMENTS

| JP | 4-219089 | 8/1992 |
| JP | 2000013608 A | 1/2000 |

(Continued)

OTHER PUBLICATIONS

European Search Report dated May 28, 2019, in corresponding European Application No. EP 191517523, 9 pages.
(Continued)

*Primary Examiner* — Quan Pham
(74) *Attorney, Agent, or Firm* — Xsensus LLP

(57) ABSTRACT

An image processing apparatus includes processing circuitry to: detect a region of a face of a person included in a moving image signal input at a certain frame rate as a specific region; set a region other than the specific region as a processing region; apply processing to the processing region to output an output image signal having information volume less than information volume of the input moving image signal; and encode the output image signal. The processing applied to the processing region includes at least one of low-pass filtering to selectively filter a spatial frequency of the processing region, contrast reduction processing to selectively reduce contrast of the processing region, and frame rate reduction processing to selectively reduce the frame rate of the processing region.

15 Claims, 12 Drawing Sheets

(56) References Cited

U.S. PATENT DOCUMENTS

| | | | |
|---|---|---|---|
| 2011/0243470 A1* | 10/2011 | Noguchi | H04N 19/176 |
| | | | 382/239 |
| 2013/0127994 A1* | 5/2013 | Mihelich | H04N 13/194 |
| | | | 348/46 |
| 2013/0278799 A1* | 10/2013 | Yamashita | H04N 5/2352 |
| | | | 348/239 |
| 2014/0085477 A1* | 3/2014 | Takano | G06K 9/00791 |
| | | | 348/148 |
| 2017/0013225 A1 | 1/2017 | Takahashi et al. | |
| 2017/0357148 A1 | 12/2017 | Nose | |
| 2018/0035088 A1 | 2/2018 | Nose | |
| 2018/0061199 A1* | 3/2018 | Sakomizu | H04N 19/167 |
| 2018/0091762 A1* | 3/2018 | Miyakawa | H04N 5/77 |
| 2018/0261141 A1 | 9/2018 | Nose | |
| 2018/0270428 A1 | 9/2018 | Nose et al. | |
| 2020/0036944 A1* | 1/2020 | Zhu | H04N 7/185 |

FOREIGN PATENT DOCUMENTS

| | | |
|---|---|---|
| JP | 2002271793 A | 9/2002 |
| JP | 2009027457 A | 2/2009 |
| JP | 2017-022689 | 1/2017 |

OTHER PUBLICATIONS

University of South Florida, "How do I reduce the file size of an image?" XP55588923, Tech Ease, dated Jan. 5, 2018, 6 pages.

* cited by examiner

FIG. 10A

| | | |
|---|---|---|
| 1/9 | 1/9 | 1/9 |
| 1/9 | 1/9 | 1/9 |
| 1/9 | 1/9 | 1/9 |

| | | | | |
|---|---|---|---|---|
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |
| 1/25 | 1/25 | 1/25 | 1/25 | 1/25 |

IMAGE PROCESSING APPARATUS, IMAGE PROCESSING SYSTEM, IMAGE PROCESSING METHOD, AND RECORDING MEDIUM

CROSS-REFERENCE TO RELATED APPLICATIONS

This patent application is based on and claims priority pursuant to 35 U.S.C. § 119(a) to Japanese Patent Application No. 2018-009066, filed on Jan. 23, 2018, in the Japan Patent Office, the entire disclosure of which is hereby incorporated by reference herein.

BACKGROUND

Technical Field

The present invention relates to an image processing apparatus, an image processing system, an image processing method, and a recording medium.

Discussion of the Background Art

Communication equipment such as a unified communication system (UCS) have spread in presentations, conferences, or the like, which use a moving image to make a video conference more convenient than phone communication.

In the video conference, the quality of moving images and sounds may be degraded in a case where the network bandwidth is narrow.

SUMMARY

Example embodiments of the present invention include an image processing apparatus including processing circuitry to: detect a region of a face of a person included in a moving image signal input at a certain frame rate as a specific region; set a region other than the specific region as a processing region; apply processing to the processing region to output an output image signal having information volume less than information volume of the input moving image signal; and encode the output image signal. The processing applied to the processing region includes at least one of low-pass filtering to selectively filter a spatial frequency of the processing region, contrast reduction processing to selectively reduce contrast of the processing region, and frame rate reduction processing to selectively reduce the frame rate of the processing region.

Example embodiments of the present invention include an image processing system including a plurality of image processing apparatuses, including at least one image processing apparatus described above.

Example embodiments of the present invention include an image processing method including: inputting a moving image signal at a certain frame rate; detecting a region of a face of a person included in the input moving image signal as a specific region; setting a region other than the specific region as a processing region; applying processing to the processing region to output an output image signal having information volume less than information volume of the input moving image signal; and encoding the output image signal. The processing being applied to the processing region includes at least one of selectively filtering a spatial frequency of the processing region, selectively reducing contrast of the processing region, and selectively reducing the frame rate of the processing region.

Example embodiments of the present invention include a recording medium storing a control program for performing the above-described image processing method.

BRIEF DESCRIPTION I/F THE DRAWINGS

A more complete appreciation of the disclosure and many of the attendant advantages and features thereof can be readily obtained and understood from the following detailed description with reference to the accompanying drawings, wherein:

FIGS. 10A and 10B are diagrams illustrating a spatial filter used in the image processing apparatus according to the second embodiment;

Figure 1:
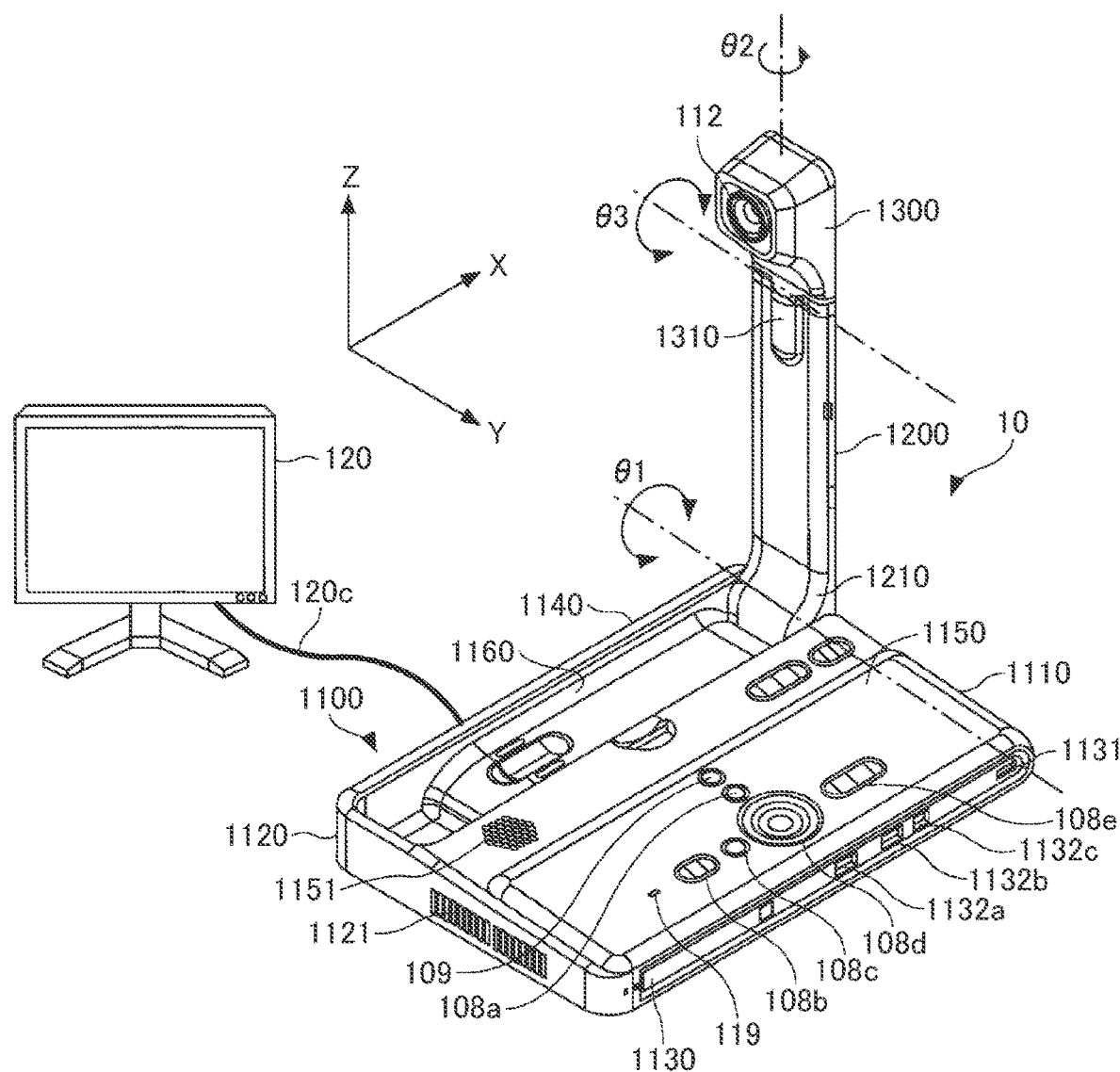
FIG. 1 is an external view illustrating an example of a configuration of an image processing apparatus according to a first embodiment.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

To maintain the quality of moving images, which may be degraded due to, for example, the narrow bandwidth network, information volume of the moving image may be reduced. In recent years, in particular, there are more frequent applications of the video conference using the Internet. Accordingly, low-capacity network lines between sites or sudden congestion depending on time zones increases cases of deterioration of the quality of moving images. This leads to a growing need to further reduce the information volume of overall moving images while maintaining the image quality of the area to be focused.

First Embodiment

First, an example of a configuration of an image processing apparatus according to a first embodiment will be described. FIG. 1 is an external view of an image processing apparatus 10 according to the present embodiment. As illustrated in FIG. 1, the image processing apparatus 10 includes a casing 1100, an arm 1200, and a camera housing 1300. The casing 1100 includes, on its front wall surface 1110, an intake surface formed by a plurality of intake holes and includes, on its rear wall surface 1120 of the casing 1100, an exhaust surface 1121 having a plurality of exhaust holes. This configuration is applicable to drive a cooling fan built in the casing 1100 to take in outside air behind the image processing apparatus 10 via the intake surface and discharge the air to the rear of the image processing apparatus 10 via the exhaust surface 1121. The casing 1100 has a sound pickup hole 1131 formed in its right wall surface 1130 so as to enable the built-in microphone 114 to pick up sounds such as voice, or any other sound including noise.

The casing 1100 includes an operation panel 1150 formed on the right wall surface 1130 side. The operation panel 1150 includes a plurality of operation buttons (108a to 108e), a power switch 109, an alarm lamp 119, and further includes a sound emitting surface 1151 having a plurality of sound output holes for transmitting sound output from a built-in speaker 115. The casing 1100 has, on its left wall surface 1140 side, a mount 1160 as a recess for mounting the arm 1200 and the camera housing 1300. The casing 1100 has, on its right wall surface 1130, a plurality of connection ports (1132a to 1132c) for electrically connecting cables to a connection IN 118. The casing 1100 also includes, on a left wall surface 1140, a connection port for electrically connecting a cable 120c for a display 120 to the connection I/F 118.

Next, the arm 1200 is attached to the casing 1100 via a torque hinge 1210. The arm 1200 is rotatable in a vertical direction with respect to the casing 1100 within a range of a tilt angle θ1 of 135 degrees. FIG. 1 illustrates a state in which the tilt angle θ1 is 90 degrees. The camera housing 1300 contains a built-in camera 112 enabling imaging of a user, a document, a room, or the like. The camera housing 1300 further contains a torque hinge 1310. The camera housing 1300 is mounted to the arm 1200 via the torque hinge 1310. The camera housing 1300 is rotatable in the vertical and horizontal directions in a range of a pan angle θ2 of ±180 degrees and in a range of a tilt angle θ3 of ±45 degrees with the state illustrated in FIG. 1 as 0 degrees with respect to the arm 1200.

The external view of FIG. 1 is merely an example and is not limited to this appearance. As another example, the image processing apparatus 10 may be a general purpose computer, a mobile phone terminal, a projector, an electronic whiteboard, an electronic signage (digital signage), or the like. In a case where a computer used as the image processing apparatus 10 has no microphone or camera, it is possible to couple an external microphone and a camera to the computer. In a case where the image processing apparatus 10 is a general purpose computer, a mobile phone terminal, or the like, the image processing apparatus 10 may be connected to the Internet by wireless communication using a wireless LAN, a mobile phone network, or the like. In a case where the image processing apparatus 10 is implemented by a general purpose computer, it is possible to install an application for executing processing of the image processing apparatus 10 in the computer.

Figure 2:
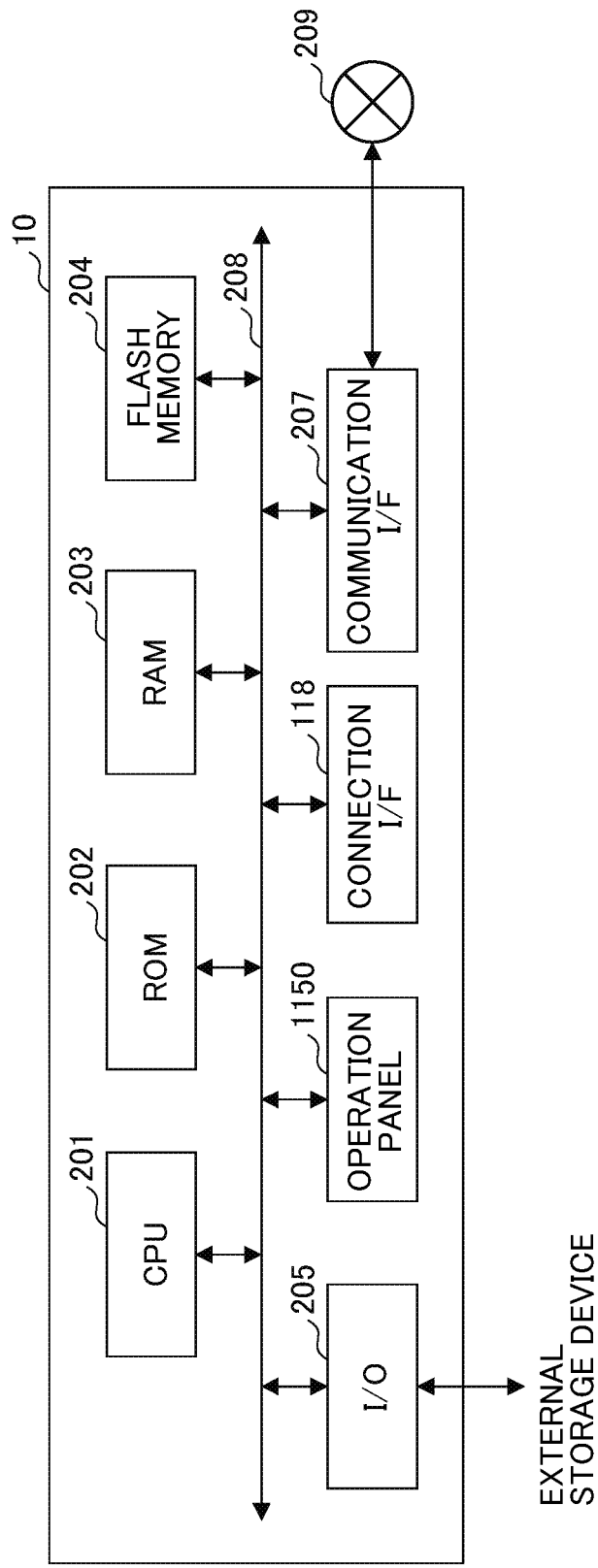
FIG. 2 is a block diagram illustrating an example of a hardware configuration of the image processing apparatus according to the first embodiment.

Next, an example of a hardware configuration of the image processing apparatus 10 of the present embodiment will be described. FIG. 2 is a block diagram illustrating an example of a hardware configuration of the image processing apparatus 10 according to the present embodiment. As illustrated in FIG. 2, the image processing apparatus 10 includes a central processing unit (CPU) 201, a read only memory (ROM) 202, a random access memory (RAM) 203, and a flash memory 204. The image processing apparatus 10 further includes an I/O 205, the operation panel 1150, the connection interface (connection I/F) 118, and a communication interface (I/F) 207. These are mutually connected via a system bus 208.

The CPU 201 performs overall control of the operation of the image processing apparatus 10. The CPU 201 executes a program stored in the ROM 202, the flash memory 204, or the like, with the RAM 203 as a work area (working region) so as to perform overall control of the operation of the image processing apparatus 10 to implement various functions to be described below.

The operation panel 1150 receives various inputs according to the user's operation. While this example includes a plurality of operation buttons (108a to 108e), the present invention is not limited to this example. For example, the operation panel 1150 may be implemented by a liquid crystal display device (LCD) or an organic EL display device having a touch panel function.

The I/O 205 is connected to an external storage such as a universal serial bus (USB), enabling data input/output with the external storage. The connection I/F 118 is an interface for connecting an external device such as a personal computer (PC) to the image processing apparatus 10. The communication I/F 207 is an interface for connecting to the network 209.

Note that the processing performed by the CPU 201 may partially or entirely be implemented by an electronic circuit such as a Field-Programmable Gate Array (FPGA) or an ASIC.

Figure 3:
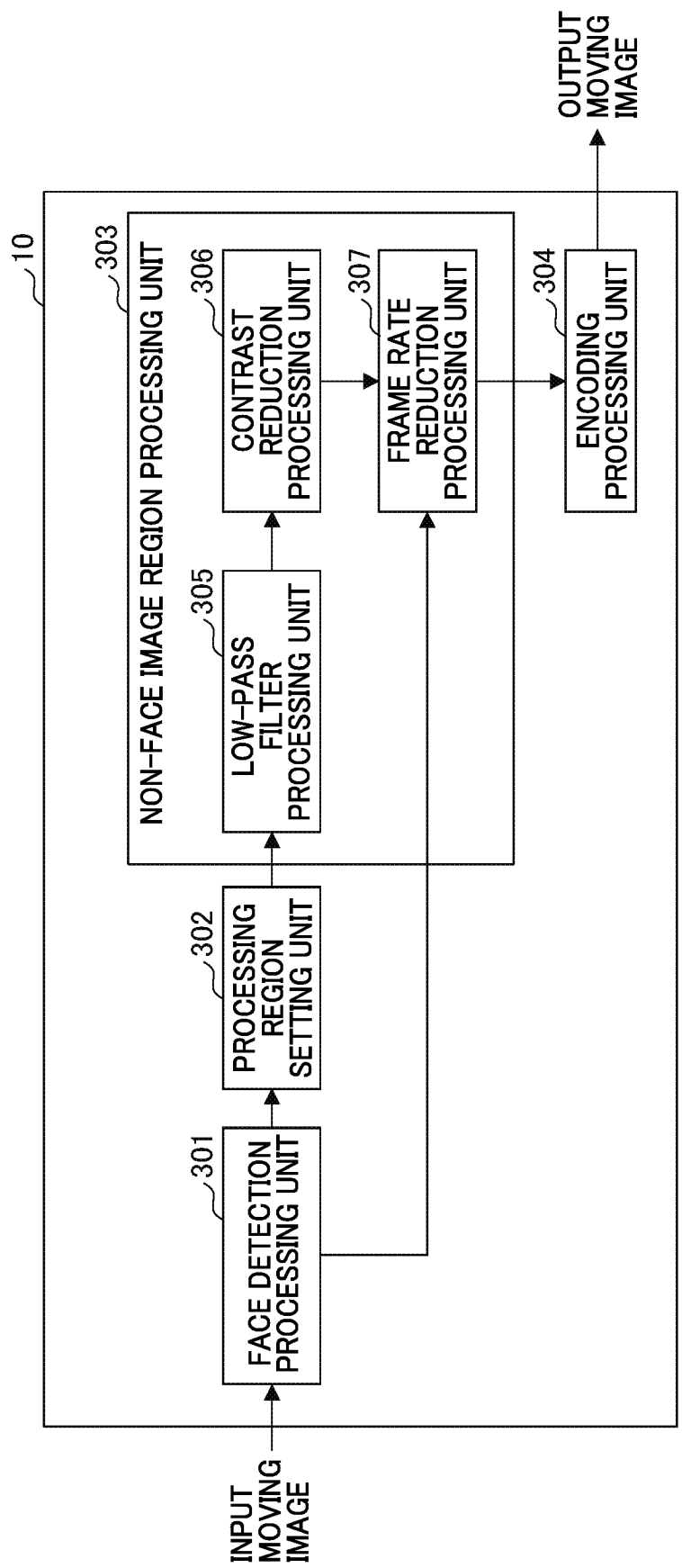
FIG. 3 is a block diagram illustrating an example of a functional configuration of the image processing apparatus according to the first embodiment.

Next, an example of a functional configuration of the image processing apparatus of the present embodiment will be described. FIG. 3 is a block diagram illustrating an example of a functional configuration of the image processing apparatus according to the present embodiment. As illustrated in FIG. 3, the image processing apparatus 10 includes a face detection processing unit 301, a processing region setting unit 302, a non-face image region processing unit 303, and an encoding processing unit 304. These units are functions or operations to be performed by the CPU 201 according to a control program stored in any desired memory such as the flash memory 204.

The face detection processing unit 301 detects a person's face included in a moving image to be input. Specifically, an image region corresponding to the person's face is detected in each of the images input in time series as a moving image, that is, an image for each of frames. In the following description, an image region corresponding to the person's face will be referred to as a face image region. The face image region is an example of "a person's face region included in a moving image signal", and is an example of a "specific region".

The face detection processing unit 301 also detects a movement amount of the person's face between frames of the input moving image, and outputs the detected movement amount to a frame rate reduction processing unit 307. This will be described in detail in the description of FIG. 7 separately.

The processing region setting unit 302 sets a region as a processing target. In the present embodiment, an image region other than the face image region is defined as a processing target, so as to be set as a processing region. In the following description, an image region other than the face image region will be referred to as a non-face image region.

A single-frame image in which the processing region is set is input to the non-face image region processing unit 303. The non-face image region processing unit 303 includes a low-pass filter processing unit 305, a contrast reduction processing unit 306, and the frame rate reduction processing unit 307.

The low-pass filter processing unit 305 selectively performs low-pass filtering processing on a non-face image region of the input image. The low-pass filtering processing passes a low spatial frequency band alone while blocking other bands in an image.

Figure 4:
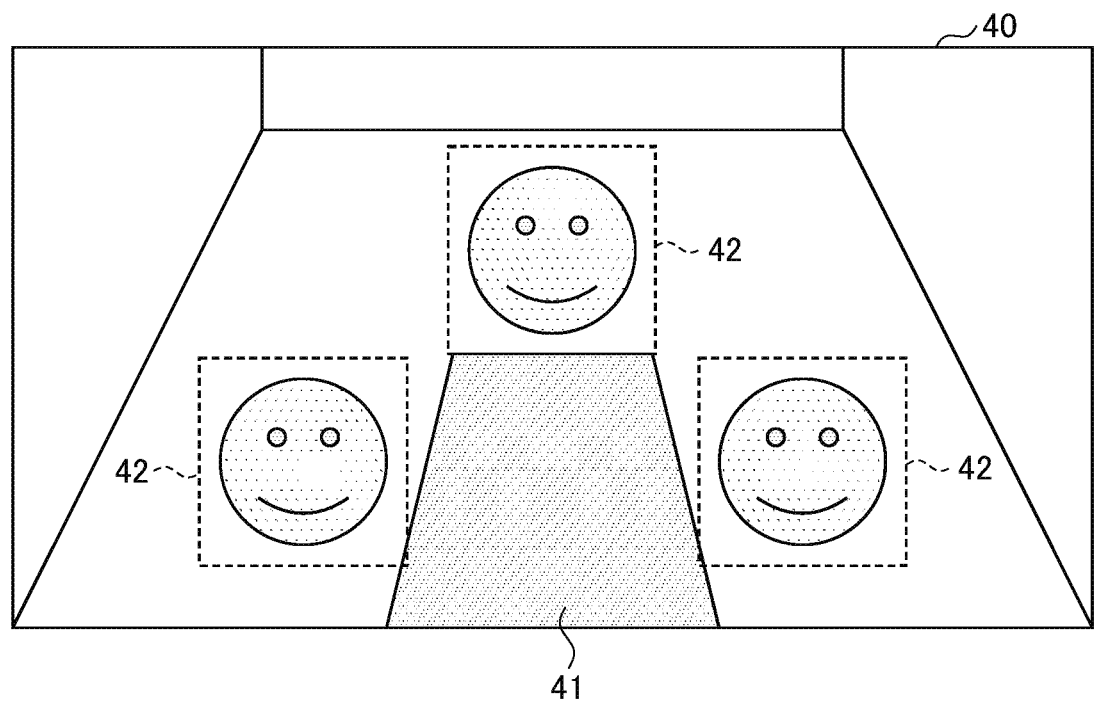
FIG. 4 is a diagram illustrating operation of processing performed by the image processing apparatus according to the first embodiment.

Here, operation of executing the processing by the low-pass filter processing unit 305 on a non-face image region of the input image will be described with reference to FIG. 4. FIG. 4 illustrates an image 40 in which three people are having a conference around a desk 41 in a conference room. Each of three regions 42 indicated by broken lines in FIG. 4 is a face image region of each of three persons. A region other than the region 42 in the image 40 is a non-face image region. The low-pass filter processing unit 305 selectively performs low-pass filtering processing on such non-face image region. The contrast reduction processing unit 306 and the frame rate reduction processing unit 307 described below selectively perform processing on such non-face image region in a similar manner.

Referring back to FIG. 3, the contrast reduction processing unit 306 performs processing of selectively reducing contrast on the non-face image region of the input image. In this disclosure, contrast is a brightness difference in an image, and the contrast reduction processing unit 306 performs processing of reducing the contrast, that is, reducing the difference in brightness.

The frame rate reduction processing unit 307 performs processing of selectively reducing the frame rate on a non-face image region of an input image. The frame rate is the number of frames processed per unit time in a moving image, that is, the number of still images or the number of frames. For example, in a case where the frame rate of the input moving image is 30 frame per second (fps), the frame rate reduction processing unit 307 selectively reduces the frame rate to 15 fps for a non-face image region.

Figure 5:
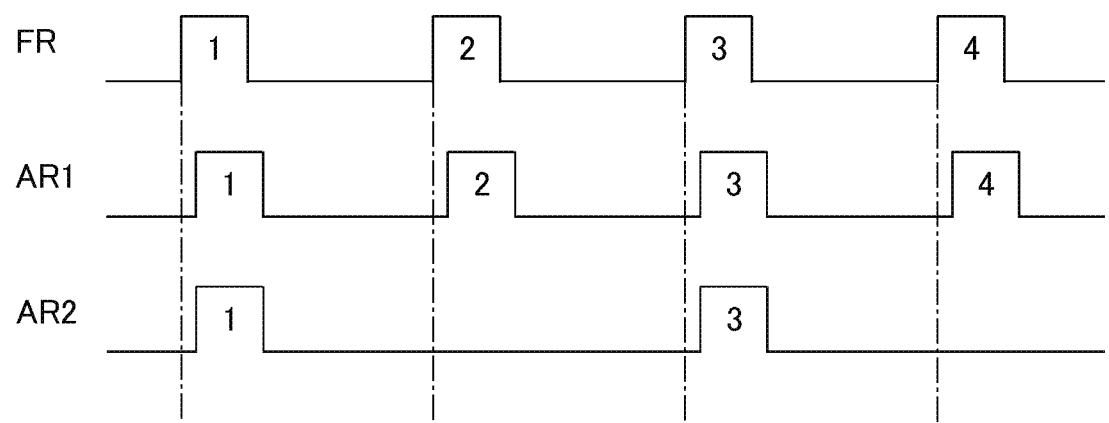
FIG. 5 is a timing chart illustrating an update timing for each of regions of a moving image in the image processing apparatus according to the first embodiment.

Here, operation of processing performed by the frame rate reduction processing unit 307 will be described with reference to FIG. 5. FIG. 5 is a timing chart illustrating an example of an update timing for each of image regions in a moving image.

In FIG. 5, a signal FR is a signal indicating a timing at which an image of one frame in a moving image is input to the image processing apparatus 10. In FIG. 5, images of four frames are input to the image processing apparatus 10 at each of timings indicated by the signal FR.

A signal AR1 is a signal indicating timings of updating the face image region of the single-frame image in a moving image. Similarly, a signal AR2 is a signal indicating update timings of a non-face image region. The signal AR1 in FIG. 5 indicates that the face image region is updated once at a timing of one input of a single-frame image. Conversely, the signal AR2 indicates that the non-face image region is updated once at a timing of two inputs of the single-frame image. That is, in the non-face image region, the update is thinned out once and the frame rate is reduced. In this manner, the frame rate reduction processing unit 307 selectively reduces the frame rate of a non-face image region of an input image.

Referring back to FIG. 3, the image that has undergone execution of each of the processing by the low-pass filter processing unit 305, the contrast reduction processing unit 306, and the frame rate reduction processing unit 307 onto its non-face image region is input to the encoding processing unit 304. In other words, an output image signal of the non-face image region processing unit 303 is input to the encoding processing unit 304.

While the present embodiment is an example in which all the types of processing on the low-pass filter processing unit 305, the contrast reduction processing unit 306, and the frame rate reduction processing unit 307 is performed, the present invention is not limited to this example. This means one or two types of processing may be performed among these.

Alternatively, the non-face image region processing unit 303 may include the contrast reduction processing unit 306 and the frame rate reduction processing unit 307, and the non-face image region processing unit 303 may perform at least one type of processing from these.

The encoding processing unit 304 encodes the output image signal from the non-face image region processing unit 303. In the present embodiment, the encoding processing unit 304 applies encoding processing based on H.264 that is one of moving image compression standards as an example. The encoded image is sequentially output from the image processing apparatus 10 as a single-frame image in the moving image.

Note that the face detection processing unit 301, the processing region setting unit 302, and the non-face image region processing unit 303 are an example of the processing means that applies predetermined processing to a moving image signal, more particularly, on the region other than the specific region. Here, the predetermined processing is processing set beforehand to reduce the information volume of the moving image signal.

Here, effects of reducing the moving image capacity by each of the low-pass filter processing unit 305 and the contrast reduction processing unit 306 will be described with reference to FIG. 6.

Figure 6:
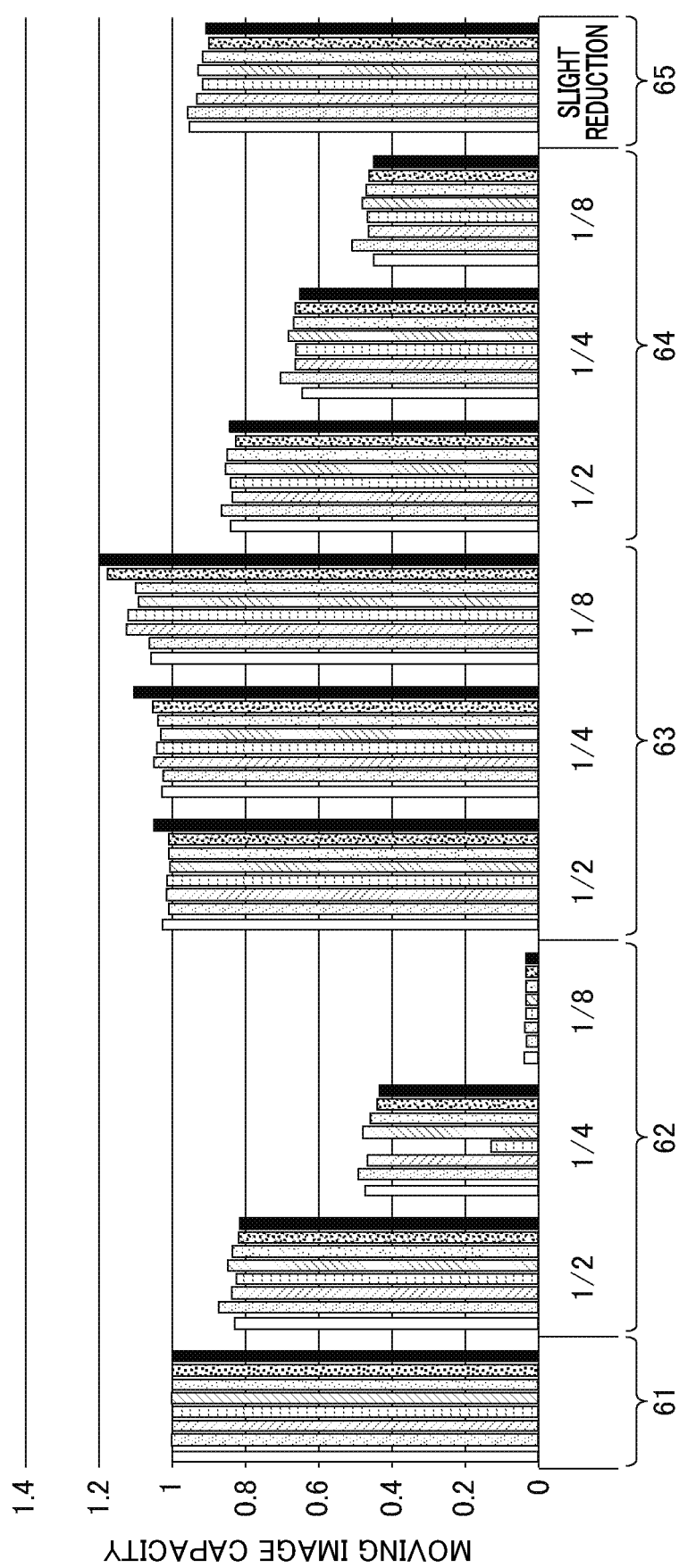
FIG. 6 is a graph for explaining an effect of reducing moving image capacity by the image processing apparatus according to the first embodiment.

In FIG. 6, the vertical axis indicates the moving image capacity. Note that the vertical axis is displayed on a scale standardized such that the moving image capacity in a case where no processing has been performed on the non-face image region is defined as one. The horizontal axis illustrates classifications representing individual processing. FIG. 6 illustrates classifications 61 to 65, each of the classifications indicating eight bar graphs. Eight bar graphs for individual classifications indicate processing results for eight types of test images for individual classifications.

Classification 61 is a case where no processing has been performed on the non-face image region. Classification 62 is a case where processing has been performed by the low-pass filter processing unit 305 on the non-face image region. Classification 63 is a case where number of colors reduction processing has been performed on the non-face image region, as the first comparative example. Classification 64 is a case where processing has been performed by the contrast reduction processing unit 306 on the non-face image region. Classification 65 is a case where the noise removal processing has been performed on the non-face image region as a second comparative example.

Each of the numbers "½", "¼", and "⅛" in the classification 62 indicate the image resolution reduction level due to the low-pass filter processing unit 305. In other words, this indicates the image resolution reduction level corresponding to the blocking amount of high spatial frequency band due to the low-pass filtering processing. Each of the numbers "½", "¼", and "⅛" in classification 63 indicates the number of colors reduction level of an image due to the number of colors reduction processing. Numbers "½", "¼", and "⅛" in classification 64 indicate the contrast reduction level of the image due to the contrast reduction processing unit 306.

As described above, since processing of classification 61 is defined as a reference of standardization, all eight bar graphs have the moving image capacities of one in classification 61. In classification 62, the moving image capacity is greatly reduced in accordance with the resolution reduction level. In classification 63, there is no effect of reducing the moving image capacity due to the reduction in the number of colors, but rather the moving image capacity is increased with the reduction in the number of colors. This is considered to be due to an increase of tone jump due to the reduction in the number of colors and the inhibition of the compression effect. In classification 64, the moving image capacity is reduced in accordance with the reduction in the contrast of the resolution. In classification 65, the moving image capacity is slightly reduced due to noise removal.

As described above, as illustrated in FIG. 6, the low-pass filter processing unit 305 and the contrast reduction processing unit 306 can be used to further suitably reduce the moving image capacity, that is, the information volume in the moving image.

Figure 7:
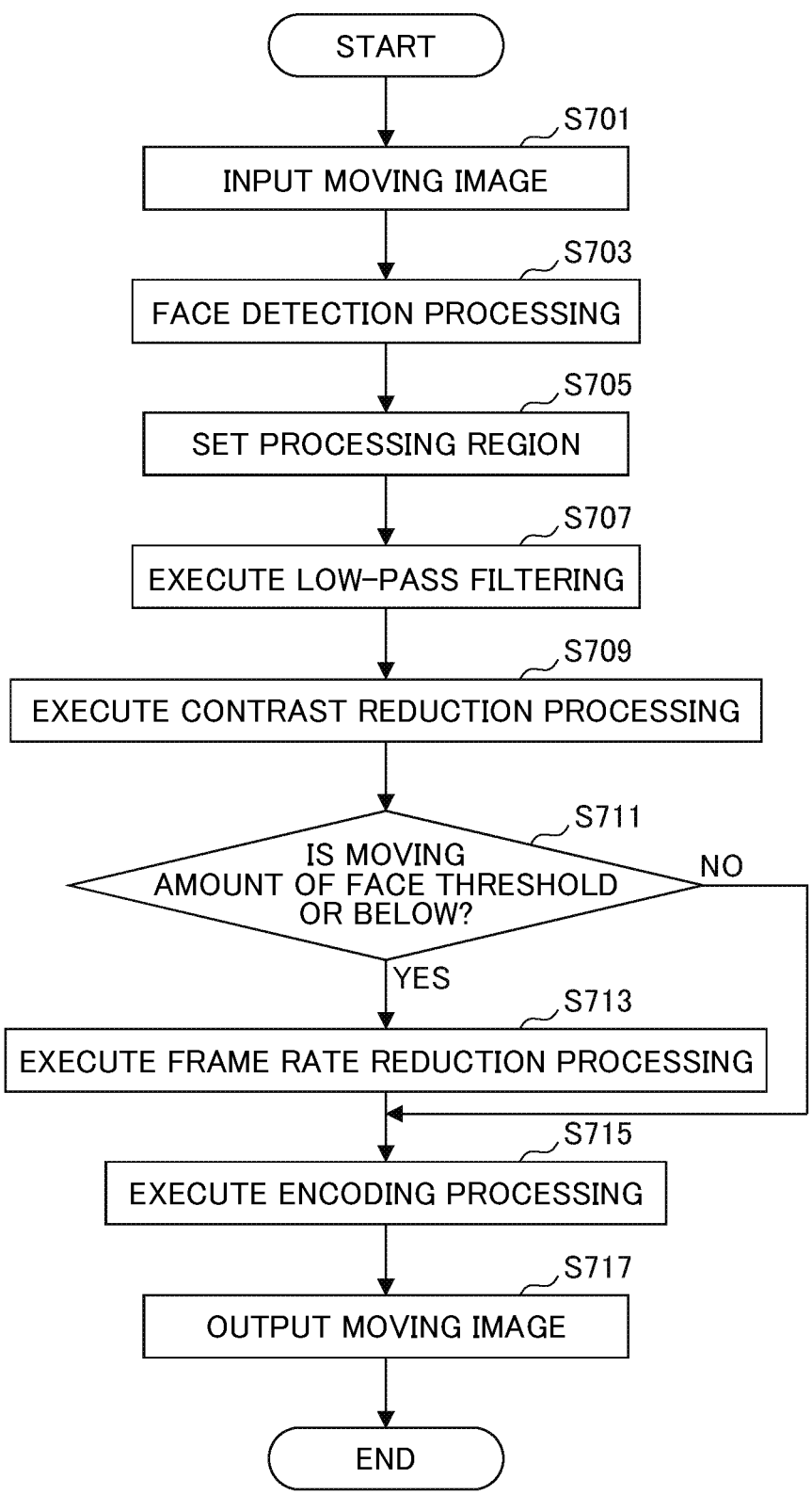
FIG. 7 is a flowchart illustrating an example of processing performed by the image processing apparatus according to the first embodiment.

Next, an example of processing by the image processing apparatus 10 of the present embodiment will be described with reference to the flowchart of FIG. 7.

First, in step S701, a moving image is input to the image processing apparatus 10.

Subsequently, in step S703, the face detection processing unit 301 performs face detection processing on a single-frame image in the moving image and outputs information of the detected face image region to the processing region setting unit 302. For example, the face image region is specified in X-Y coordinates, and such coordinate information and the single-frame image are output to the processing region setting unit 302.

Subsequently, in step S705, the processing region setting unit 302 sets a non-face image region on the input image as a processing region.

Subsequently, in step S707, the low-pass filter processing unit 305 selectively performs low-pass filter processing on the non-face image region of the input image.

Subsequently, in step S709, the contrast reduction processing unit 306 selectively performs the contrast reduction processing on the non-face image region of the input image.

Subsequently, in step S711, the face detection processing unit 301 detects the movement amount of the face in the face image region. For example, the face detection processing unit 301 compares a sum of pixel luminance of the face image region in the previous single-frame image stored in the RAM 203 with a sum of pixel luminance of the face image region in the single-frame image currently being processed so as to detect the movement amount of the face. The face detection processing unit 301 outputs the detected movement amount of the face to the frame rate reduction processing unit 307, as the movement amount of the face between frames. The frame rate reduction processing unit 307 determines whether the movement amount of the face is a prescribed threshold or less.

In a case where it is determined that the movement amount of the face detected in step S711 is the prescribed threshold or less, the frame rate reduction processing unit 307 selectively performs in step S713 the frame rate reduction processing on the non-face image region in the input image. In another case where it is determined that the movement amount detected in step S711 is not the prescribed threshold or less, the processing skips step S713 and proceeds to step S715. The above-mentioned threshold is calculated beforehand and stored in the RAM 203 or the like, as an example of prescribed value.

Meanwhile, the face detection processing unit 301 stores the current single-frame image in the RAM 203 to use it for detecting the movement amount of the face in the image of the next one frame.

Here, detection of the movement amount of the face will be described. In a case where the inter-frame change in the moving image is small, the moving image would not be unnatural even when the frame rate reduction processing is selectively performed on the non-face image region of the input image. However, selectively executing the frame rate reduction processing on the non-face image region of the input image in a case where the inter-frame change in the moving image is great might lead to observation of awkwardness in the change and unnaturalness of the moving image.

To handle this problem, the present embodiment performs, in step S711, detection of the face movement amount between the frames so as to detect the magnitude of the change between the frames in the moving image. In other words, the face movement amount between the frames is detected as a characteristic value representing magnitude of the change between the frames in the moving image. The frame rate reduction processing is selectively performed on the non-face image region of the input image in a case where the movement amount of the face is the threshold or less. This suppresses reduction of the frame rate in an image with large motion so as to prevent the moving image from becoming unnatural.

Referring back to FIG. 7, the encoding processing unit 304 performs in step S715 encoding processing on the input image.

The encoded image is output from the image processing apparatus 10 as a single-frame image in the moving image.

The above processing makes it possible to reduce the information volume such as background of less importance while maintaining the information volume of a person as information with high importance in the moving image.

As described above, according to the present embodiment, the information volume of moving image is reduced while maintaining the image quality of an area to be focused. This increases the compression ratio of the moving image.

For example, this is suitable in a case of using an apparatus that transmits a moving image via the Internet, such as UCS. As described above, degradation of quality of moving images and sounds is reduced.

The UCS is communication equipment for constructing, on a cloud, a platform enabling real-time bi-directional communication or multi-site communication of video and audio.

The present embodiment is also suitable for storing a large number of moving images like a monitoring camera.

Meanwhile, as a method for increasing the compression ratio of a moving image, it is also conceivable to reduce a noise signal in the moving image. However, the reduction of the noise signal in the moving image would be effective in the case of video conference using a projector or the like in a dark room, while the noise signal of the moving image is originally small in the case of video conference in a bright room, and thus, no large effect can be obtained. In recent years, a video conference often uses a backlight type display device such as a liquid crystal display to be performed in a bright room, making it difficult to improve the compression ratio of moving images even with the reduction of noise signals. According to the present embodiment, it is possible to further increase the compression ratio of a moving image as compared with such a technique of reducing noise signals.

In the present embodiment, processing of at least one of the contrast reduction processing unit 306 and the frame rate reduction processing unit 307 is to be selectively performed on the non-face image region of the input image. This further reduces the information volume of the moving image as compared with the case where the low-pass filter processing alone is selectively performed.

Second Embodiment

Next, an image processing apparatus of the second embodiment will be described with reference to FIGS. 8 to 10. In the first embodiment, the description of the same configuration as in the previously described embodiment may be omitted.

In the present embodiment, a non-face image region is divided into a plurality of regions in accordance with a distance from the face image region, and size of a spatial filter used in the processing by the low-pass filter processing unit is changed for each of the divided regions.

Figure 8:
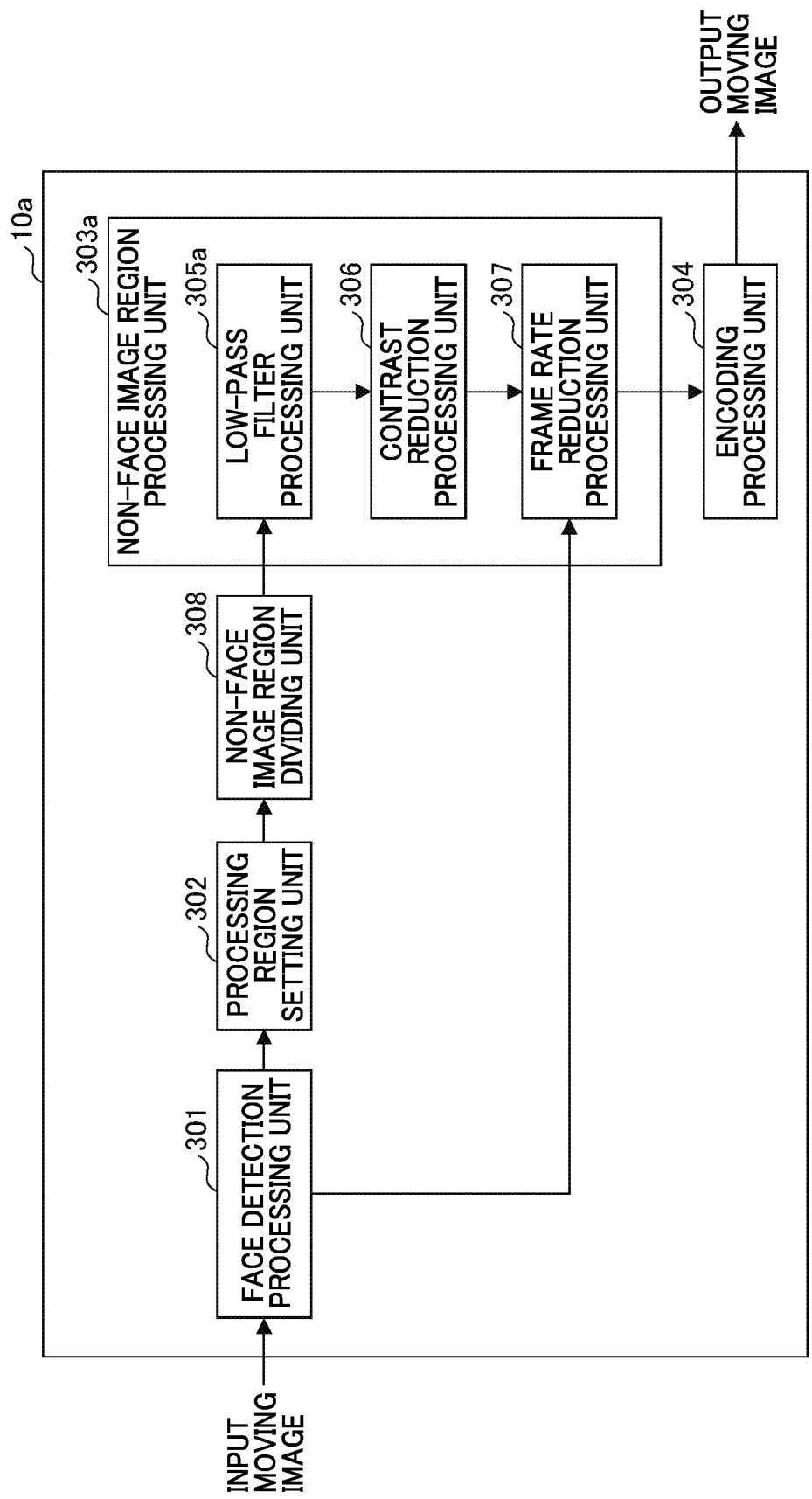
FIG. 8 is a block diagram illustrating an example of a functional configuration of an image processing apparatus according to a second embodiment.

FIG. 8 is a block diagram illustrating an example of a functional configuration of an image processing apparatus 10a according to the present embodiment. The image processing apparatus 10a includes a non-face image region dividing unit 308 and a non-face image region processing unit 303a. The non-face image region processing unit 303a includes a low-pass filter processing unit 305a.

The non-face image region dividing unit 308 divides a non-face image region into a plurality of regions in accordance with the distance from the face image region. FIG. 9 illustrates an example of an image in which the non-face image region dividing unit 308 divides the non-face image region into a plurality of regions. Directions indicated by outlined arrows in FIG. 9 indicate the X and Y directions corresponding to the X and Y coordinates of the image, respectively.

Figure 9:
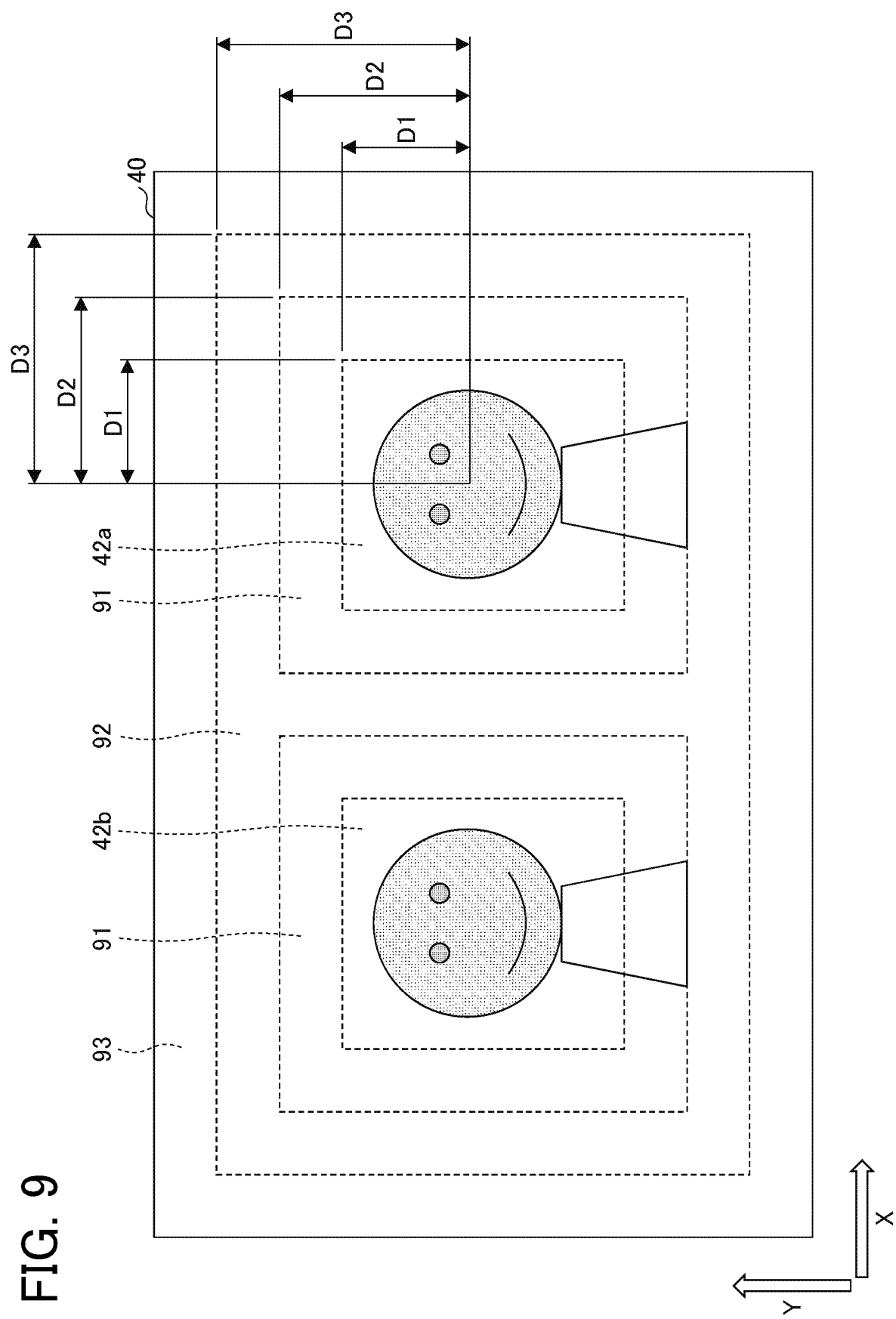
FIG. 9 is a diagram illustrating operation of processing performed by the image processing apparatus according to the second embodiment.

In FIG. 9, regions 42a and 42b are face image regions of two persons detected by the face detection processing unit 301. The region 91 is a region spaced from the center position of the region 42a in each of the X and Y directions by a distance D1 or more and less than a distance D2. The unit of this distance is the number of pixels, for example. Similarly, a region 92 is a region spaced from the center position of the region 42a in each of the X and Y directions by the distance D2 or more and less than a distance D3. A region 93 is a region spaced from the center position of the region 42a by the distance D3 or more in the X and Y directions.

The number of divisions by the non-face image region dividing unit 308 and the distance from the face image region are predetermined and stored in the RAM 203 or the like. The division of the non-face image region according to the distance to the region 42b being the face image region is similar to that for the region 42a, and thus it is omitted here.

Next, FIGS. 10A and 10B illustrate a spatial filter used in the processing by the low-pass filter processing unit 305a. FIG. 10A is a 3×3 tap size spatial filter 101 and FIG. 10B is a 5×5 tap size spatial filter 102. Each of cells in the spatial filters 101 and 102 corresponds to a pixel in the image.

The low-pass filter processing unit 305a performs convolution, that is, convolution integration on the spatial filters 101 and 102 and pixels in the non-face image region. The values illustrated in each of the cells are integrated and added to each of pixels of the non-face image region, resulting in reduction of a difference in luminance between adjacent pixels in the processing region. This would block a high frequency band of the spatial frequency of the image in the processing region and thus achieves operational effects of the low-pass filter. The larger the tap size of the spatial filter, the more reduced the difference in luminance between adjacent pixels in the processing region, resulting in achieving greater operational effects of the low-pass filter. That is, the more of the frequency band on the high frequency side would be blocked.

For example, in a moving image, an image region close to a person's face image region often includes a hand or other parts of a person. The image including a hand or other parts of a person might contain important information that can be transmitted by a gesture, or the like, even though not as much as the face image. Conversely, the image region away from the person's face image region does not include even the person's body and hands, and often includes information of low importance to be transmitted, such as walls of the conference room.

In the present embodiment, the low-pass filter processing unit 305a uses the spatial filter 101 having a small tap size for the region 91 close to the face image region of the person, and uses the spatial filter 102 having a large tap size for the region 92 and the region 93 away from the person's face image region. This broadens the frequency band to be blocked in the region of low importance, so as to further reduce the information volume. This makes it possible to further reduce the information volume of the moving image while maintaining the subjective moving image quality, enabling further enhancement of the compression ratio of the moving image.

Note that coefficients of the spatial filter are not limited to the values illustrated in FIGS. 10A and 10B.

The effects other than those described above are similar to those described in the first embodiment.

Third Embodiment

Next, an image processing apparatus according to a third embodiment will be described with reference to FIGS. 11 to 12. Note that descriptions of the same constituent parts as in the previously described embodiments in the first and second embodiments might be omitted in some cases.

In the present embodiment, the non-face image region is divided into a plurality of regions in accordance with the distance from the face image region, and the dynamic range of the contrast in the processing performed by the contrast reduction processing unit is changed for each of the divided regions.

Figure 11:
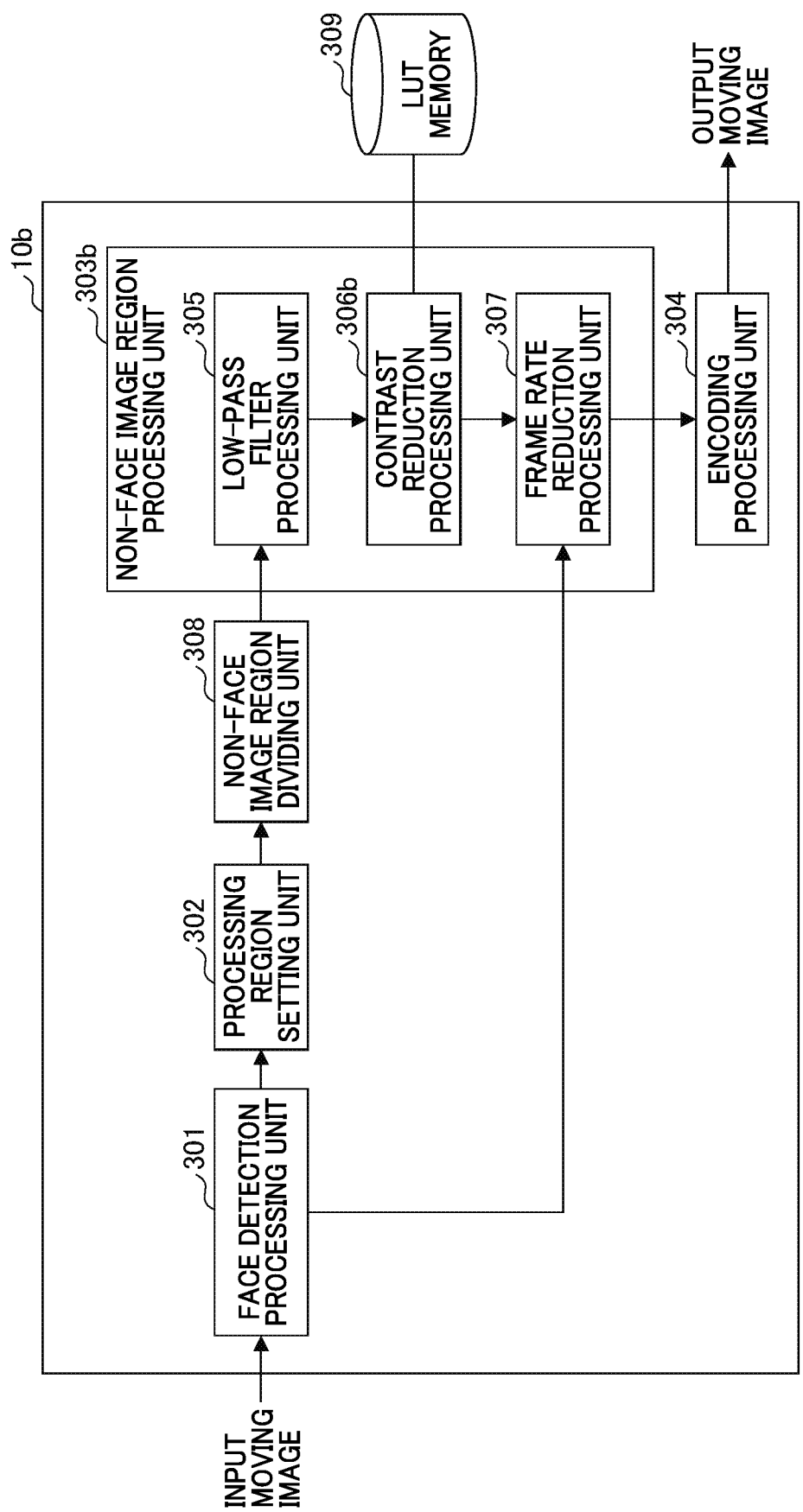
FIG. 11 is a block diagram illustrating an example of a functional configuration of an image processing apparatus according to a third embodiment.

FIG. 11 is a block diagram illustrating an example of a functional configuration of an image processing apparatus 10b according to the present embodiment. The image processing apparatus 10b includes a non-face image region processing unit 303b and a look up table (LUT) memory 309. The non-face image region processing unit 303b includes a contrast reduction processing unit 306b.

The LUT memory 309 is implemented by the RAM 203, for example. LUT data is input to the RAM 203 via the network 209, or is input from an external storage device to the RAM 203 via the I/O 205 and stored.

The technique of dividing the non-face image region into a plurality of regions in accordance with the distance from the face image region by the non-face image region dividing unit 308 is similar to that described in the second embodiment. The image obtained by dividing the non-face image region into a plurality of regions by the non-face image region dividing unit 308 is similar to that described with reference to FIG. 9.

Figure 12:
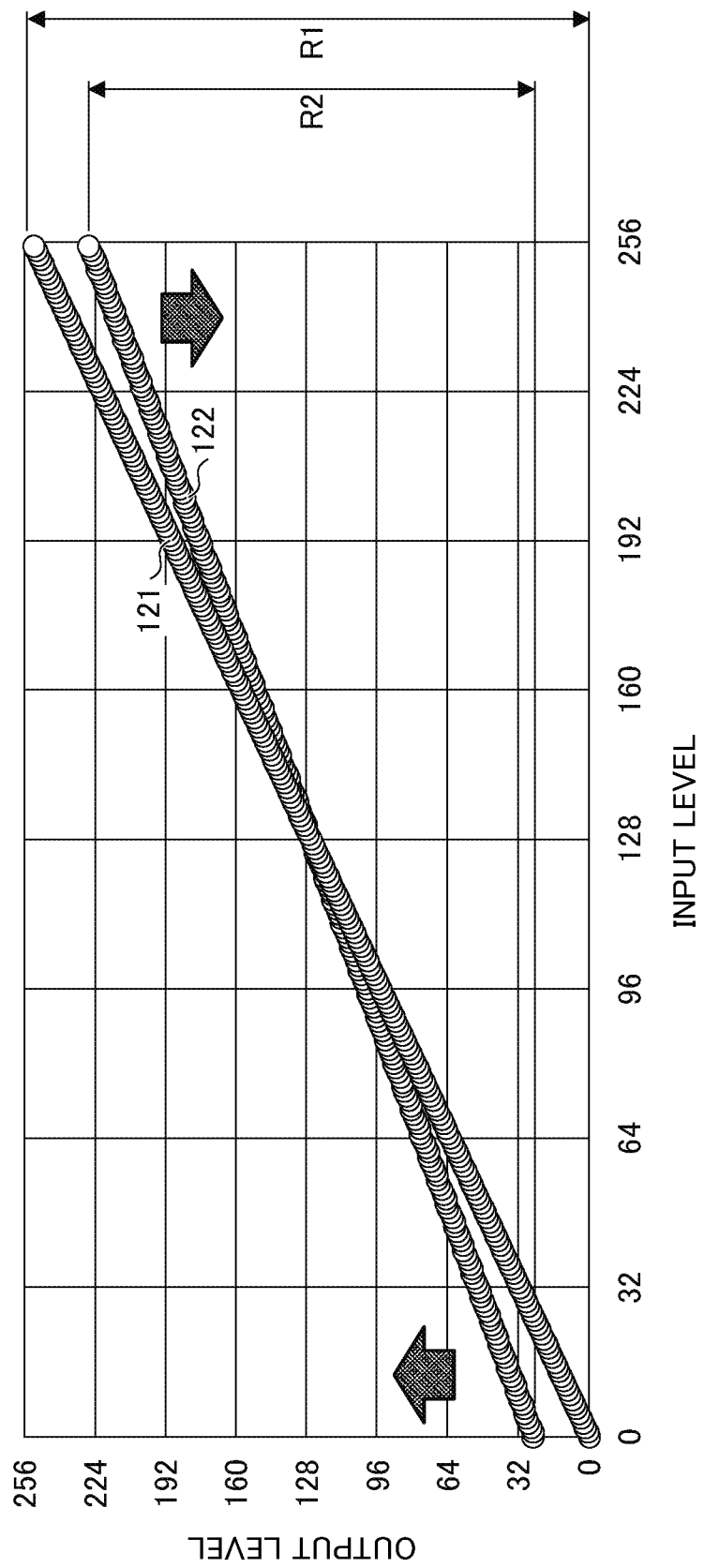
FIG. 12 is a diagram illustrating operation of processing performed by the image processing apparatus according to the third embodiment.

FIG. 12 is a diagram illustrating operation of processing performed by the contrast reduction processing unit 306b. The horizontal axis of FIG. 12 illustrates the luminance of the pixel before undergoing contrast reduction processing, that is, pixel luminance input to the contrast reduction processing unit 306b. The vertical axis illustrates the luminance of the pixel after undergoing contrast reduction processing, that is, pixel luminance output from the contrast reduction processing unit 306b. That is, with the use of the contrast reduction processing unit 306b, the input pixel luminance is output after undergoing luminance conversion. Note that the present embodiment uses an 8-bit image as an example, in which the pixel luminance is indicated in the range of 0 to 256.

In FIG. 12, a plot 121 illustrates a case where the input pixel luminance and the output pixel luminance are equal. In this case, there is no change in the contrast. In comparison, a plot 122 illustrates a case where the contrast is reduced by 25% by the contrast reduction processing unit 306b. A range R1 illustrates the dynamic range of the plot 121 and a range R2 illustrates the dynamic range of the plot 122.

The LUT memory 309 stores data associating input pixel luminance with output pixel luminance as illustrated in FIG. 12. The contrast reduction processing unit 306b refers to the LUT memory 309 and obtains the pixel luminance for output corresponding to the input pixel luminance. With this configuration, the conversion processing of pixel luminance is performed.

In FIG. 12, the direction indicated by thick black arrows is a direction of reducing the dynamic range. That is, the dynamic range is reduced by conversion processing performed such that the pixel luminance is low in a case where the input pixel luminance is high, or such that the input pixel luminance is high in a case where the input pixel luminance is low. The smaller the dynamic range, the less the luminance information included in the image region, and this leads to reduction of the information volume.

Meanwhile, as described in the second embodiment, the image region close to the face image region of the person in the moving image includes information of high importance while the image region away from the person's face image region includes those with lower importance.

Therefore, the contrast reduction processing unit 306b in the present embodiment performs the contrast reduction processing in the region 91 close to the face image region of the person within a relatively wide dynamic range. In contrast, the contrast reduction processing unit 306b performs contrast reduction processing in the region 92 and the region 93 away from the face image region of the person within a relatively low dynamic range. This allows low dynamic ranges to be used in a region with lower importance, leading to reduction of the information volume. This makes it possible to further reduce the information volume of the moving image while maintaining the subjective moving image quality, enabling further enhancement of the compression ratio of the moving image.

The effects other than those described above are similar to those described in the first embodiment. It is also possible to combine the present embodiment with the second embodiment.

Furthermore, the contrast reduction processing unit 306b can perform the contrast reduction processing using the LUT to enable reduction of the processing load and improve the processing speed as compared with the case where the contrast reduction processing is performed by calculation.

Fourth Embodiment

Figure 13:
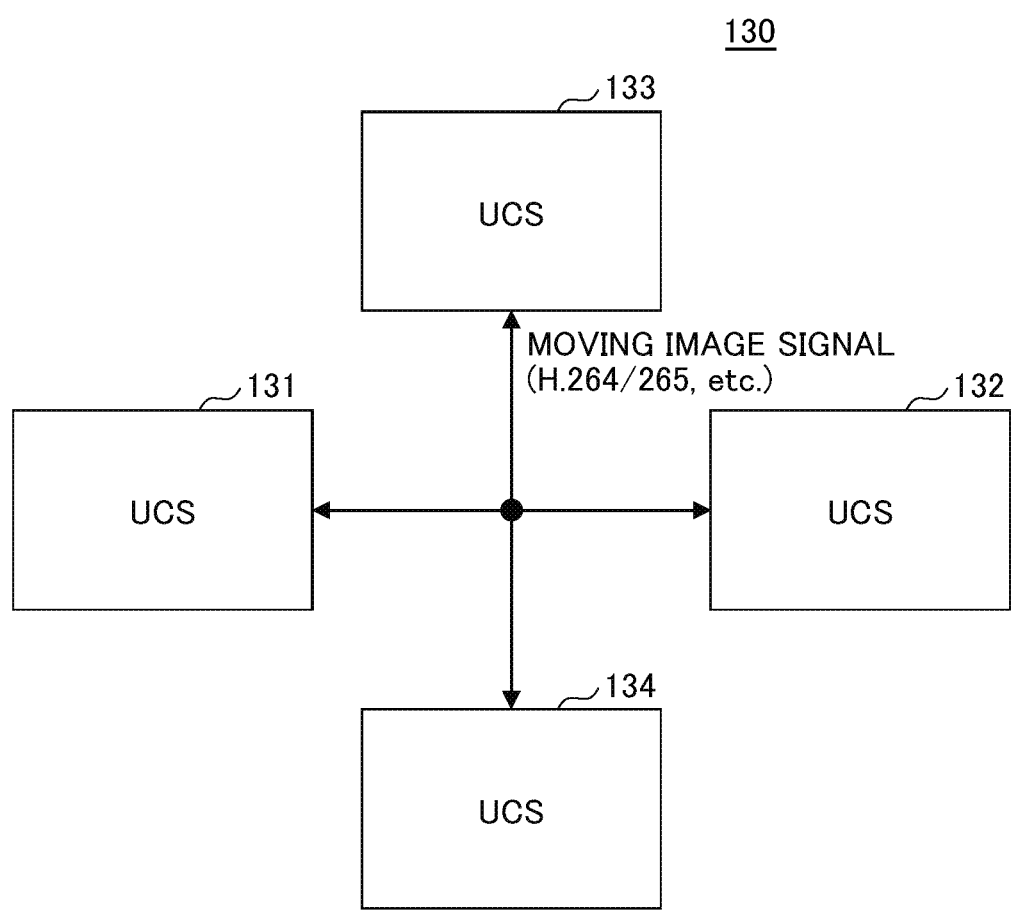
FIG. 13 is a schematic view illustrating an example of a configuration of a video conference system according to a fourth embodiment.

Next, the video conference system according to a fourth embodiment will be described with reference to FIG. 13. Note that descriptions of the same constituent parts as in the previously described embodiments in the first and second embodiments might be omitted in some cases.

A video conference system 130 includes UCSs 131 to 134. The UCSs 131 to 134 are installed at mutually different sites.

As described above, UCS is communication equipment for constructing an on-cloud platform that enables real-time bi-directional communication of video and audio and multi-site communication. The video conference system 130 including the UCS 131 to 134 is an example of an image processing system including a plurality of image processing apparatuses 10.

Each of the UCSs 131 to 134 is implemented by the image processing apparatus 10 communicably connected to the Internet, for example, via a wireless LAN. The UCSs 131 to 134 can mutually communicate via the Internet. The video conference system 130 can use the UCSs 131 to 134 to transmit and receive moving image signals to implement a multi-site remote video conference.

The video conference system 130 includes the image processing apparatus 10, enabling reduction of the information volume of the moving image while maintaining the image quality of an area to be focused, leading to prevention of degradation of the quality of moving images and sounds in each of the UCSs. This enables smooth implementation of a video conference.

Note that each of the UCSs 131 to 134 in the video conference system 130 may be implemented by any one of the image processing apparatus 10a or 10b, in alternative to the image processing apparatus 10.

The effects other than those described above are similar to those described in the first to third embodiments.

While the image processing apparatus, and the image processing system (the video conference system) according to the embodiment have been described above, the present invention is not limited to the above embodiment, and various modifications and improvements are possible within the scope of the present invention.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An image processing apparatus comprising:
   processing circuitry configured to:
   detect a region of a face of a person included in a moving image signal input at a certain frame rate as a specific region;
   set an other region which is other than the specific region as a processing region;
   detect a movement amount of the region of the face;
   apply processing to the processing region to output an output image signal having information volume less than information volume of the moving image signal; and
   encode the output image signal,
   wherein the processing applied to the processing region includes frame rate reduction processing performed on the processing region which is the other region when the movement amount of the region of the face which has been detected is less than a predetermined amount of movement without performing the frame rate reduction processing on the region of the face, and
   wherein the frame rate reduction processing is not performed on the processing region when the movement amount of the region of the face is determined not to be less than the predetermine amount of movement.

2. The image processing apparatus according to claim 1,
   wherein the processing applied to the processing region includes contrast reduction processing to selectively reduce contrast of the processing region by reducing a dynamic range of the processing region, and
   wherein the processing circuitry reduces the contrast of the processing region in the dynamic range that is determined in accordance with a distance from the specific region.

3. The image processing apparatus according to claim 1,
   wherein the processing applied to the processing region includes contrast reduction processing to selectively reduce contrast of the processing region by reducing a dynamic range of the processing region, and
   wherein the processing circuitry uses a look up table to reduce the contrast.

4. An image processing system comprising:
   a plurality of image processing apparatuses communicably connected with each other, wherein at least one of the image processing apparatuses is implemented by the image processing apparatus according to claim 1.

5. The image processing system according to claim 4,
   wherein the plurality of image processing apparatuses are provided at a plurality of sites, and
   wherein the at least one image processing apparatus is configured to output the output image signal to carry out a video conference.

6. The image processing apparatus according to claim 1,
   wherein the processing applied to the processing region includes contrast reduction processing to selectively reduce contrast of the processing region by reducing a dynamic range of the processing region, and
   wherein the processing to selectively reduce contrast results in the dynamic range of luminance of the processing region being less than a dynamic range of the specific region.

7. The image processing apparatus according to claim 1, wherein the processing applied to the processing region includes low-pass filtering to selectively filter a spatial frequency of the processing region.

8. An image processing method comprising:
   inputting a moving image signal at a certain frame rate;
   detecting a region of a face of a person included in the moving image signal as a specific region;
   setting an other region which is other than the specific region as a processing region;
   detecting a movement amount of the region of the face;
   applying processing to the processing region to output an output image signal having information volume less than information volume of the moving image signal; and
   encoding the output image signal,
   wherein the processing applied to the processing region includes frame rate reduction processing performed on the processing region which is the other region when the movement amount of the region of the face which has been detected is less than a predetermined amount of movement without performing the frame rate reduction processing on the region of the face, and
   wherein the frame rate reduction processing is not performed on the processing region when the movement amount of the region of the face is determined not to be less than the predetermine amount of movement.

9. The image processing method according to claim 8, wherein:
   wherein the processing applied to the processing region includes contrast reduction processing to selectively reduce contrast of the processing region by reducing a dynamic range of the processing region, and
   the processing reduces the contrast of the processing region in the dynamic range, the dynamic range being determined in accordance with a distance from the specific region.

10. The image processing method according to claim 8, wherein:
    wherein the processing applied to the processing region includes contrast reduction processing to selectively reduce contrast of the processing region by reducing a dynamic range of the processing region, and
    the processing uses a look up table to reduce the contrast.

11. The image processing method according to claim 8, wherein:
    wherein the processing applied to the processing region includes contrast reduction processing to selectively reduce contrast of the processing region by reducing a dynamic range of the processing region, and the processing to selectively reduce contrast results in the dynamic range of luminance of the processing region being less than a dynamic range of luminance of the specific region.

12. A non-transitory recording medium storing a plurality of instructions which, when executed by one or more processors, cause the processors to perform an image processing method, the method comprising:
   inputting a moving image signal at a certain frame rate;
   detecting a region of a face of a person included in the moving image signal as a specific region;
   setting an other region which is other than the specific region as a processing region;
   detecting a movement amount of the region of the face;
   applying processing to the processing region to output an output image signal having information volume less than information volume of the moving image signal; and
   encoding the output image signal,
   wherein the processing applied to the processing region includes frame rate reduction processing performed on the processing region which is the other region when the movement amount of the region of the face which has been detected is less than a predetermined amount of movement without performing the frame rate reduction processing on the region of the face, and
   wherein the frame rate reduction processing is not performed on the processing region when the movement amount of the region of the face is determined not to be less than the predetermine amount of movement.

13. The non-transitory recording medium according to claim 12, wherein:
   wherein the processing applied to the processing region includes contrast reduction processing to selectively reduce contrast of the processing region by reducing a dynamic range of the processing region, and
   the processing reduces the contrast of the processing region in the dynamic range that is determined in accordance with a distance from the specific region.

14. The non-transitory recording medium according to claim 12, wherein:
   wherein the processing applied to the processing region includes contrast reduction processing to selectively reduce contrast of the processing region by reducing a dynamic range of the processing region, and
   the processing uses a look up table to reduce the contrast.

15. The non-transitory recording medium according to claim 12, wherein:
   wherein the processing applied to the processing region includes contrast reduction processing to selectively reduce contrast of the processing region by reducing a dynamic range of the processing region, and
   the processing to selectively reduce contrast results in the dynamic range of luminance of the processing region being less than a dynamic range of luminance of the specific region.

* * * * *